Figure 1:
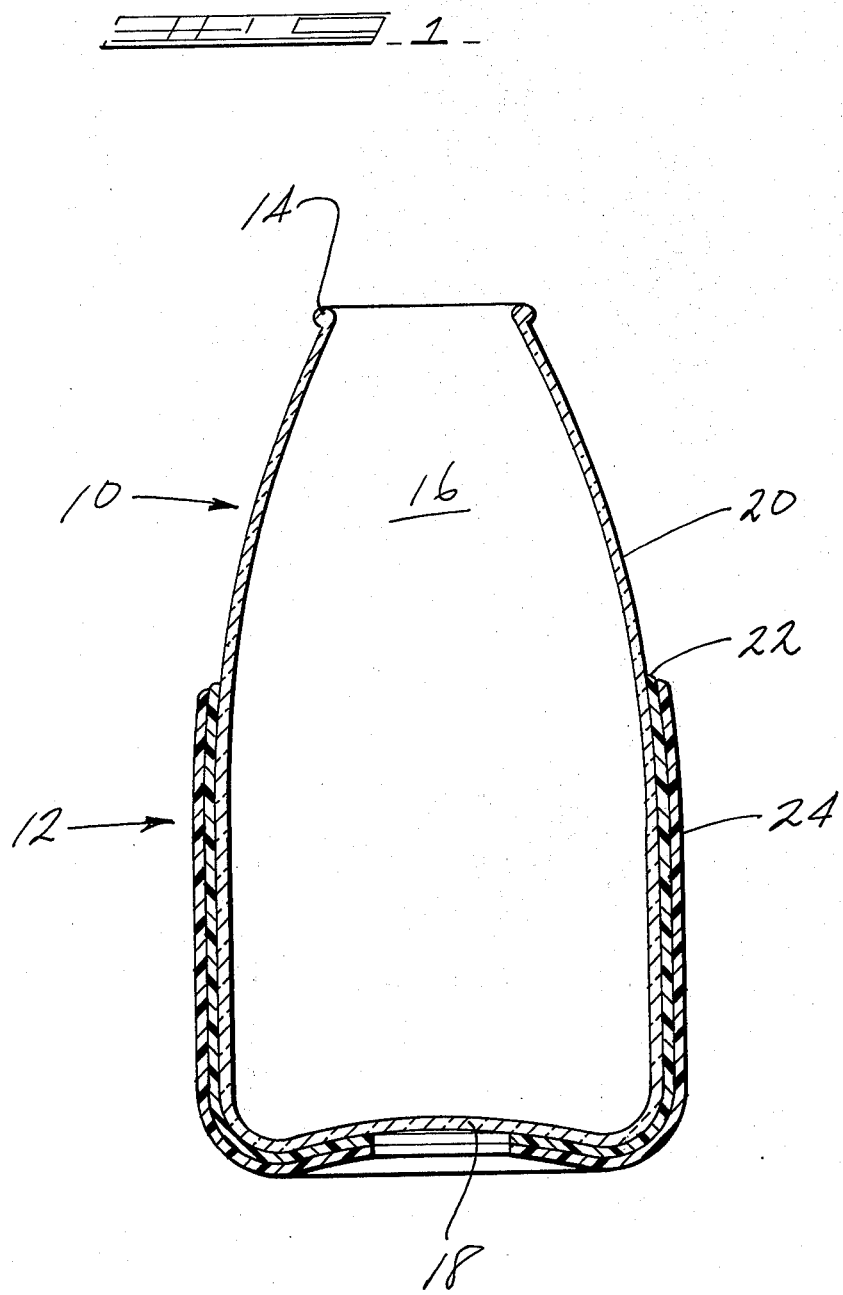

United States Patent [19]
Karabedian

[11] 3,979,000
[45] Sept. 7, 1976

[54] CONTAINER WITH IMPROVED HEAT-SHRUNK CELLULAR SLEEVE

[75] Inventor: James A. Karabedian, Garden City, N.Y.

[73] Assignee: Owens-Illinois, Inc., Toledo, Ohio

[22] Filed: Mar. 5, 1975

[21] Appl. No.: 555,507

Related U.S. Application Data

[63] Continuation-in-part of Ser. No. 505,646, Sept. 13, 1974.

[52] U.S. Cl. .......................... 215/12 R; 215/DIG. 6; 428/35; 428/315; 428/321; 428/910; 428/913
[51] Int. Cl.² .......................................... B65D 11/16
[58] Field of Search ................ 428/35, 36, 71, 310, 428/315, 321, 322, 910, 913; 215/12 R, DIG. 6

[56] References Cited
UNITED STATES PATENTS

| | | | |
|---|---|---|---|
| 3,446,760 | 5/1969 | Nowak et al. | 260/876 |
| 3,649,437 | 3/1972 | Wolinski et al. | 428/315 |
| 3,663,663 | 5/1972 | McAda | 260/897 B |
| 3,760,968 | 9/1973 | Amberg et al. | 215/12 R |

*Primary Examiner*—William J. Van Balen
*Attorney, Agent, or Firm*—Robert F. Rywalski; Edward J. Holler

[57] ABSTRACT

There is disclosed herein improved packages, and methods of forming same, of the type wherein a container, such as for example a glass container, like a bottle or jar, is provided externally thereof with a heat-shrunk, cellular thermoplastic member, circumferentially and snugly engaging a sidewall portion of the container; the improvement resides in employing, as the thermoplastic member, a composite structure, or laminate, having a closed cellular polymeric layer preponderantly of polystyrene having incorporated therein from zero weight percent up to compatible amounts of a copolymer of ethylene and an alkyl ester of alpha-beta monoethylenically unsaturated carboxylic acid or a copolymer of ethylene and vinyl acetate or a copolymer of ethylene and an alpha-beta monoethylenically unsaturated carboxylic acid, or mixtures thereof, and, in adhered relationship to said cellular layer, a layer of a non-cellular polymeric material preponderantly of ethylene moieties having incorporated therein moieties of vinyl acetate, or an alkyl ester of alpha-beta monoethylenically unsaturated carboxylic acid, or an alpha-beta monoethylenically unsaturated carboxylic acid, or mixtures thereof. By having the non-cellular layer disposed intermediate the sidewall portion of the container and the cellular layer, improved glass retention characteristics are achieved with increased economics.

16 Claims, 1 Drawing Figure

CONTAINER WITH IMPROVED HEAT-SHRUNK CELLULAR SLEEVE

CROSS REFERENCES

This application is a continuation-in-part of U.S. Ser. No. 505,646 filed Dec. 13, 1974.

BACKGROUND

The present invention relates to container packages like bottles and jars, for example, glass containers and, more particularly, relates to an improvement in packages of the type wherein a wall portion of a container is, externally and circumferentially, provided with a heat-shrunk thermoplastic cellular member. The present invention is also directed to an improved method for forming such packages.

Recently the packaging industry has successfully developed a package wherein a container, such as, for example, a bottle or jar, which has an upper rim portion defining a mouth opening thereof and a lower portion defining the bottom thereof and including an annular wall joining the rim portion to the bottom portion, is provided, at least along an axial portion of the wall with a heat-shrunk member of a foamed or cellular thermoplastic material in circumferential snug engagement therewith. This member, which is generally in the form of a sleeve, or tubular shape, which circumferentially envelopes at least an axial portion of the wall, provides excellent characteristics to the package and especially to a package wherein the container is a glass container. Such packages are, for example, described in U.S. Pat. No. 3,760,968. Typically these packages are produced by first forming a web, film, or sheet, of a heat-shrinkable, cellular thermoplastic material, by conventional processing, for example, by an extrusion process like a "blown bubble" extrusion process. The process is carried out to provide a heat-shrinking characteristic in the sheet, by a conventional stretching operation, in which the major heat-shrinking, or orientation, or stretching, occurs along the machine direction and only a minor heat-shrinking occurs along the transverse, or cross, direction. The sheet, or web, is also provided, by air cooling, with a skin at each opposed surface of higher density than the central, or core, portion of the cellular web and the depth of the skin on one side is at least about 1.2 times greater than the depth on the other side; these surfaces are smooth, i.e. not roughed up to become fibrillated. This sheet, or film, can then be appropriately provided with a decorative image and the sheet then slit along the machine direction of extrusion to provide rectilinear films, or sheets, which are then employed in forming the package. These rectilinear sheets, or films, are again cut, this time along the cross direction, and then formed into a generally, right cylindrical sleeve with the machine direction of prior forming being the circumferential, or radial, direction of the sleeve and the axial dimension of the sleeve being the previous cross, or transverse, dimension. The reason for this is to provide a more significant circumferential, or radial, shrinkage about the container than an axial shrinkage. Additionally, the sleeve is formed so that the greater skin depth side is the interior surface. Typically, the rectilinear sheet is formed into a sleeve by being brought into contact with a mandrel and the opposed ends of the rectilinear sheet then sealed to each other, such as, for example, in an overlapping relationship by the use of appropriate means, for example, a compressing heat mechanism. The sleeve is then brought into telescopic relation with the container and positioned or located around a wall portion and heat-shrunk to bring it into an annular snug, compressing, engagement with the wall portion of a container. After heat-shrinking, therefore, the sleeve is disposed circumferentially outwardly of the annular sidewall of the container and is in a heat-shrink condition generally disposed at least along a portion of the axial dimension of the sidewalls. Typically, when containers are employed that have a recessed bottom, such as, a concave bottom, the heat-shrunk sleeve includes a lower annular portion extending partially inwardly into the recessed area of the bottom. For further details as to the method of forming such plastic covered containers reference may be had to U.S. Pat. No. 3,767,496 and reference may also be had to U.S. Pat. No. 3,802,942 which discloses suitable apparatus for forming such packages. The three above noted patents are hereby incorporated by reference.

Of course, the container, in addition to having the heat-shrunk member positioned therearound, may be provided with thermoplastic coating materials at various and numerous locations on the container. This concept of employing a heat-shrunk member in combination with various types, and locations, of polymeric coatings is described in co-pending application, U.S. Ser. No. 372,156, filed June 21, 1973.

In the above patents the materials which are taught to be employed to form the rectilinear sheet, or film, which is then formed into the sleeve and heat-shrunk, include polyvinyl chloride, medium or low density polyethylene, polystyrene, "copolymers of carboxylic acid monomers with ethylene (sold under the tradename SURLYN)", cellulose esters, for example, cellulose propionate, butyrate, and acetate, polyamides, and polyurethanes. From a commercial point of view the material which has been found to be most suitable to date has been a closed cellular, general purpose polystyrene material. This material has desirable characteristics, unfortunately however, this cellular polystyrene material is also possessed of certain deficiencies not the least of which include brittleness, relatively easy fracture, poor glass retention when a glass container breaks, and susceptibility to denting, scarring, and tearing, or splitting. When one considers the total process which includes slitting, or cutting, of the material this latter problem is indeed quite significant. These deficiencies of course are reflected in consumer acceptance and also in economies for providing the above packages. The other materials are also possessed of deficiencies.

Attempts to resolve some of the deficiencies of the polystyrene sleeve were made in which a polyethylene layer was provided so that it would be disposed externally of the polystyrene upon application to the container. This approach, likewise, was not entirely satisfactory inasmuch as, for example, poor adhesion of the polyethylene layer to the polystyrene resulted.

THE INVENTION

Thus, it will be seen that a problem exists in the above reference to art of providing a sleeve member which has excellent properties including ease of printability, good flexibility, a lack of undesirable brittlenss, good resistance to fracture, good glass retention, and good resistance to denting, scarring, tearing, and splitting. In accordance with this invention, an improvement is provided with respect to the sleeve member and the problem in the prior art is solved. That is, the present invention satisfies a need in the art for providing a sleeve member which has the needed balance of properties.

Thus, in accordance with one feature of this invention there is provided an improvement in articles of manufacture comprised of a container having an annular rim defining a mouth opening at one end thereof, a lower end providing the bottom thereof, and an annular wall interposed between the rim and the lower end and which further includes a heat-shrunk, polymeric sleeve disposed circumferentially outwardly of said wall and in snug engagement therewith.

In accordance with another feature of this invention, there is provided an improvement in method for producing articles of manufacture wherein a heat-shrinkable polymeric sheet is formed into a sleeve having a major orientation, or heat-shrink characteristic, circumferentially of the sleeve, and wherein the sleeve is telescopically located about the sidewall of the container and heat-shrunk into snug engagement with the sidewall.

The improvement in the above-noted method and article essentially resides in employing a heat-shrinkable polymeric sheet, and sleeve, which is of a composite structure having a layer of closed cellular polymeric material preponderantly of polystyrene having incorporated therein, in an amount from zero weight percent up to compatible amounts, a copolymer of ethylene and vinyl acetate, or a copolymer of ethylene and an alkyl ester of an alpha-beta monoethylenically unsaturated carboxylic acid, or a copolymer of ethylene and an alpha-beta monoethylenically unsaturated carboxylic acid, or mixtures thereof, and a non-cellular polymeric layer having preponderantly ethylene moieties and incorporated therein moieties of vinyl acetate or an alkyl ester of an alpha-beta monoethylenically unsaturated carboxylic acid, or an alpha-beta monoethylenically unsaturated carboxylic acid, or mixtures thereof, the amount of said incorporated moieties in said non-cellular layer being sufficient to promote the adhesion of said layers, said non-cellular layer being intended, in ultimate utilization, to be disposed intermediate the container wall and the cellular layer.

In one embodiment of this invention, when the composite structure, in the shape of a sleeve or tubular member, is telescopically located about a glass container which is at an elevated temperature, such as for example a temperature in the range of about 140°F. to 200°F., it will be noted that when using some of the compositions described, there will be a tendency for the non-cellular layer to occasionally become sticky or tacky, because of its softening point being relatively close to the temperature which it attains by its close proximity to the heated container. In this instance occasional difficulties may be encountered in that the sleeve will not be expeditiously positioned in its desired circumferential enveloping location about the container because of the tacky condition causing a sticking to the container. To obviate this problem, and in accordance with another embodiment of this invention, the composite sheet, and/or sleeve, is provided with a thin layer or coating, on the non-cellular layer, of a nontackifying polymeric material. That is, the non-cellular layer will be provided with a polymeric material having thermal characteristics which will allow it to be slipped over the heated container without it rapidly approaching the point where it becomes so sticky, or tacky, that attachment to the container results which, as indicated above, would preclude expeditiously slipping and positioning the sleeve about the container at a preselected location. This thin layer or coating can be applied by conventional techniques, with solvent coating, employing an organic solvent solution of the polymeric and applying it, for example, onto a rectilinear sheet either prior to decorating thereof, or for that matter subsequent to the decorating thereof, and prior to the formation of the rectilinear sheet into the sleeve shaped member, being especially suitable. Alternatively, and while this is not the preferred mode, a rectilinear sheet of the composite, as described herein, can first be formed into a sleeve shaped member with the desired thin layer or coating being subsequently applied to the non-cellular layer, such as for example by flow coating the inwardly disposed surface of the sleeve (non-cellular layer), with an organic solvent solution. Generally it will be desired that this polymeric material have a softening point on the order of about 180° or 190°F. or higher. Particularly suitable materials include polystyrene, poly(alpha-methyl styrene), and mixtures thereof with polystyrene being an especially suitable nontackifying material. Exemplary polystyrenes which are quite suitable for this purpose are those having molecular weights on the order of less than about 85,000 (weight average molecular weight) with highly desirable polystyrenes being those having molecular weights in the range of about 20,000 to about 70,000 (weight average molecular weight). Suitable materials are commercially available such as, for example, the polystyrene produced and supplied commercially by the Dow Chemical Corporation under their designations PS-1, PS-2, PS-3; PS-3 has a weight average molecular weight on the order of about 60,000 and PS-1 a weight average molecular weight on the order of about 20,000. Any desirable organic solvent, such as, for example, ethyl acetate, n-propyl acetate, isopropyl acetate, toluene, methyl ethyl ketone, 2-nitropropane, ethylene glycol mono ethyl ether acetate, chlorinated solvents, e.g. methylene chloride or 1,1,1, trichloroethane, and the like may be employed. Concentrations of the solutions may vary widely but acceptable results are attained using solutions having about 20–30 weight percent solids. If desired the nontackifying characteristics of the polymeric material can be further improved by incorporating a lubricious material therein. For example, the application solution, prior to coating the non-cellular layer, could be provided with the lubricious material. The lubricious material will be employed in effective lubricating amounts, e.g. on the order of several weight percent, say 1 or 2, based on nontackifying polymer solids. Particularly suitable are the silicone oils such as, for example, the dimethyl polysiloxane lubricating oils. One such suitable lubricious material is that supplied commercially by the Dow Chemical Company as their designation DC-200 silicone.

In my co-pending application, U.S. Ser. No. 505,646, it will be noted that the disclosure is directed to having the cellular layer disposed intermediate the non-cellular layer and the wall portion of the container. In effect, the present invention amounts to a reversal of that structure and it will be found, by such reversal, that extremely desirable results are attained. Most notably it will be found that the reversed structure of this invention provides for improvements in the glass retention capabilities of a glass container which has been provided with the externally disposed heat-shrunk sleeve of composite structure as contemplated herein. This is especially true when practicing the invention in accordance with the embodiments set forth in the hereinbefore incorporated patents wherein the rectilinear sheet is formed into a sleeve shaped member by heat sealing overlapped portions thereof with an electrically heated bar or similar mechanism. It will be found that the reversed structure of the present invention provides for a much stronger, heat-sealed seam portion and it appears, although applicant does not wish to be bound by any theory, that the increase in glass retention capabilities of the sleeve is the result of having a stronger, structurally stable, heat-formed seam or heat-seal seam.

In passing it should be mentioned that when the non-cellular layer is provided with a nontackifying polymer the latter will, of course, of necessity be compatible with the non-cellular layer as well as with the cellular layer. The reason for this is that in practicing the invention where the sleeve is formed by bringing extremities of a rectilinear sheet into overlapping engagement and subsequently heat sealing same with, for example, a heated bar, the nontackifying polymer, in the overlapped portions, will be disposed intermediate the non-cellular material and the cellular material. Hence the polymer must be compatible with the cellular and non-cellular materials. That is, it must be capable of heat sealing to both of those materials and have a good affinity therefor.

An improved package of this invention is exemplified in FIG. 1 which is a vertical sectional elevational view.

The package is comprised of a container 10 and a heat-shrunk sleeve of composite structure, generally designated 12. Container 10 includes an upper rim 14 defining a mouth opening 16 of the container and further includes a lower end, or bottom, 18 and an annular sidewall 20 interposed rim 14 and lower end 18. The container, of course, can be of any configuration and of any material, but as set forth in the drawings it is exemplified as a glass container. The ultimate package, of course, will include closure means (not shown) closing mouth opening 16. Composite polymeric sleeve 12 is disposed circumferentially outwardly of at least an axial portion of wall 20 in heat-shrunk, snug engagement therewith. Composite sleeve 12, as indicated, is a two-layer structure, the first layer 22 being a non-cellular or non-foamed polymeric material generally in contact with wall 20 and the second layer 24, which is a closed cellular, or foamed, polymeric material, is disposed outwardly of non-cellular layer 22 and in adhering engagement therewith. FIG. 1 also exemplifies a package in which the lower end 18 of container 10 is recessed, i.e. possessed of a lower concave bottom, with sleeve 12 including a lower annular portion extending partially inwardly into the recessed area of the bottom. Of course, if desired the sleeve may be a full height sleeve; that is it can extend substantially along the entire wall as in FIG. 14 of U.S. Pat. No. 3,760,968.

The composite structure for use herein monoethylenically a closed cellular polymeric layer 24 and a non-cellular polymeric layer 22 adhered to the cellular layer. The polymeric material itself, of the cellular layer, is preponderantly polystyrene which has incorporated therein, from zero weight percent to compatible amounts, of a copolymer of ethylene and vinyl acetate or a copolymer of ethylene and an alkyl ester of an alpha-beta monoethylenically unsaturated carboxylic acid or a copolymer of ethylene and an alpha-beta monoethylically unsaturated carboxylic acid, or mixtures thereof. Similarly, the polymeric portion of the non-cellular layer is preponderantly ethylene moieties having incorporated therein vinyl acetate moieties or moieties of an alpha-beta monoethylenically unsaturated carboxylic acid, or moieties of an alkyl ester of an alpha-beta monoethylenically unsaturated carboxylic acid, or mixtures thereof. The adherence of polystyrene to polyethylene is quite poor; accordingly, the above copolymers when incorporated into the cellular polystyrene and/or the moiety of the non-cellular layer provide for adhesion of the respective layers and provide the composite structure with other beneficial characteristics. In passing, it should be mentioned that in order to obtain maximum glass retention characteristics of the final package it will be desirable that the adhesion of the cellular layer to the non-cellular layer not be the ultimate in terms of strength. That is, the adhesion of these two layers, which will be elaborated upon hereinafter, should not be excellent when it is desired to obtain maximum glass retention characteristics. While ethylene homopolymers, for example polyethylene, are generally not compatible with polystyrene, the above referred to copolymers have limited compatibility with polystyrene. Thus, these copolymers are incorporated in the polystyrene in an amount of anywhere from zero weight percent up to the compatible amount thereof in polystyrene. Those skilled in the art will routinely determine this compatible amount which, as used herein, means the amount which is generally miscible with polystyrene so as to be able to form a homogeneous polymeric material when combined and melt extruded. Thus, in one embodiment it will be seen that the non-cellular layer has moieties of ethylene and, vinyl acetate or an alkyl ester of an alpha-beta monoethylenically unsaturated carboxylic acid or an alpha-beta monoethylenically unsaturated carboxylic acid or mixtures thereof, and that the cellular layer, in addition to the polystyrene, contain these same types of moieties thereby providing for the adhesion of the two layers. In passing, it is generally preferred that exactly the same chemical moieties, of course, with the exception of polystyrene per se, when present in the cellular layer also be present in the non-cellular layer, but this will not be found to be essential. The amounts of copolymer incorporated in the polystyrene, along with the moiety (i.e., the vinyl acetate or an alkyl ester of an alpha-beta monoethylenically unsaturated carboxylic acid or an alpha beta monoethylenically unsaturated carboxylic acid, or mixtures thereof) of the preponderantly ethylene non-cellular polymeric layer, are balanced so as to be present in effective adhesion promoting agents. As a general matter, the less of the copolymer which is incorporated in the preponderantly polystyrene layer the more concentrated will need to be the moiety, of vinyl acetate or an alkyl ester of an alpha-beta monoethylenically unsaturated carboxylic acid (hereinafter alkyl ester) or an alpha-beta monoethylenically unsaturated carboxylic acid (hereinafter acid), or mixtures thereof, in the non-cellular preponderantly ethylene layer to provide for this adhesion. In fact, in another embodiment the cellular layer will be virtually all polystyrene, with no incorporated copolymer, and the non-cellular layer will be a moiety sufficient to provide for the adhesion of the layers. In passing, it should be mentioned however that the polymeric material of the non-cellular layer will be preponderantly ethylene moieties and that the polymeric portion of the cellular layer will be preponderantly polystyrene, i.e. each of those layers will generally be at least about 60 weight percent, and desirably on the order of at least about 80 weight percent of ethylene and polystyrene, respectively. The amounts of the respective materials, that is of the copolymer incorporated into the preponderantly polystyrene cellular layer and the amounts of the respective moieties incorporated with ethylene in the non-cellular layer, will of course vary with different materials and with different applications. Generally, however, it may be stated that these amounts can be simply and routinely determined by a quick adhesion test wherein the respective layers of the composite structure are pulled apart, or peeled away, by hand with acceptable adhesion being determined by the occurrence of areas on the non-cellular layer where material of the cellular layer is still adhered; that is, in peeling the layers apart a portion of the cellular layer ruptures and remains attached to the non-cellular layer for acceptable adhesion, as opposed to the layers easily splitting without any attachment of a portion of the cellular layer onto the non-cellular layer. Thus, for example, if the cellular layer consists virtually of 100 percent styrene homopolymer and the non-cellular layer consists virtually of 100 percent of an ethylene homopolymer, it will be found that poor adhesion results in this peeling apart in that the films are easily separated with no retention of the cellular layer onto the non-cellular layer. As hereinbefore indicated in order to minimize the glass retention capabilities of the ultimate product it is desirable that the cellular layer and non-cellular layer be attached with less than excellent adhesion. This latter type adhesion is generally the type which occurs when in pulling apart, or peeling away, the respective layers by hand extremely strong forces are required, and occasionally it may be virtually impossible to so peel the two layers apart. It should be emphasized that this degree of adhesion is perfectly satisfactory for operation but it will be found that such a strong degree of adhesion will not maximize the glass retention characteristics. At the other extreme, where the adhesion is poor, difficulties may be encountered in expeditiously utilizing the rectilinear blanks or sheets in the equipment and in the manner indicated in the incorporated patents wherein delaminating problems can cause economic penalties and quality penalties. Accordingly, the adhesion will be routinely balanced between these two extremes in order to obtain maximized operation in terms of glass retention characteristics, high quality, and economic efficiency. The desired copolymers which are incorporated into the polystyrene to form the cellular layer can be incorporated by any conventional techniques, for example, blending of the materials in a ribbon blender prior to the formation of the composite structure. Similarly the desired moiety of the non-cellular layer can simply be provided by incorporating, for example by admixing or blending, polyethylene with a copolymer of ethylene and vinyl acetate, or a copolymer of ethylene and an alkyl ester of a monoethylenically unsaturated carboxylic acid, or a copolymer of ethylene and an alpha-beta monoethylenically unsaturated acid, or mixtures thereof, or the non-cellular polymeric layer may itself simply be a copolymer; that is in the former instance the ethylene moieties of the non-cellular polymeric layer are provided by a combination of ethylene moieties from polyethylene and ethylene moieties from a copolymer or, in the latter instance, the ethylene moieties can be simply provided by all being present in a copolymer. The amount of the incorporated moieties of vinyl acetate, or an alkyl ester of an alpha-beta monoethylenically unsaturated carboxylic acid, or an alpha-beta monoethylenically unsaturated carboxylic acid, or mixtures thereof, in the preponderantly ethylene non-cellular layer will, as indicated above, be an amount sufficient to promote the adhesion of the layers. This amount will vary depending on the particular composition employed and the particular application involved and, of course, will generally be at a maximum when the amount of copolymer incorporated in the preponderantly polystyrene layer is at a minimum, for example, at about zero percent. The main practical considerations, in addition to those pointed out above with regard to maximizing glass retention capabilities and quality and cost economics, in selecting the maximum amount of the adhesion promoting moiety of the non-cellular layer will be that the composition be capable of forming a sheet or film, preferably be extrudable and the cellular layer remain flexible, resilient, and be possessed of a smooth, glossy, generally nonfibrillated surface and one which is nontacky.

The materials employed are widely commercially available and those skilled in the art will routinely select the appropriate materials. With regard to polystyrene, it is generally preferred to employ that polystyrene which is referred to in the art as general purpose styrene. Exemplary of these polystyrenes are those available from Dow Chemical Company under their designation 6041 as well as those available from Koppers Chemical Company under their designation 8G. Exemplary of the commercially available polystyrenes which will be found to be suitable are those having weight average molecular weights in excess of about 100,000, for example in the range of about 240,000 to 320,000, or those having melt flows in the range of about 1 to about 5 (ASTM Test D12378-70 at ASTM Condition G). A particularly suitable polystyrene has a weight average molecular weight of about 280,000 and a melt flow of about 2.0. Exemplary of suitable copolymers of ethylene and vinyl acetate are those copolymers having a vinyl acetate content, or moiety, of less than about 40 weight percent and an ethylene content, or moiety, in excess of about 60 weight percent. Exemplary of these copolymers are the copolymers of ethylene and vinyl acetate commercially supplied by U.S.I. having vinyl acetate moieties ranging from about 18 to about 33 weight percent, ethylene moieties in an amount of about 67 to about 82 weight percent and melt indexes ranging from about 0.4 to about 125. Preferred compositions are those having vinyl acetate moieties in the range of about 28 to 31 weight percent with melt indexes in the range of about 1 to about 3. Exemplary copolymers of ethylene and an alkyl ester of an alpha-beta monoethylenically unsaturated carboxylic acid are those wherein the carboxylic acid moiety contains from 3 to 5 carbon atoms and wherein the alkyl moiety contains from 1 to 3 carbon atoms; for example, methyl, ethyl, and propyl esters of, for example, acrylic acid, methacrylic acid, and ethacrylic acid. Preferably these copolymers will have an ethylene content, or moiety, in excess of about 75 weight percent and the moiety of the alkyl ester of a monoethylenically unsaturated carboxylic acid will be less than about 25 weight percent and desirably these copolymers will have melt indexes of less than about 21 and preferably in the range of about 1 to 3. A particularly preferred copolymer is a copolymer of ethylene and ethylacrylate such as, for example, those commercially supplied by Union Carbide Corporation having ethylacrylate moieties in the range of about 1.7 to about 22.5 weight percent and ethylene moieties in the range of about 98.3 percent to about 77.5 weight percent, with melt indexes in the range of about 0.1 to 21. Particularly suitable ethylene copolymers are those having an ethylacrylate moiety of about 11 weight percent to about 22 percent and an ethylene content of about 89 to about 78 weight percent, with those having an ethylacrylate moiety of about 15 to about 18 weight percent and an ethylene moiety of about 82 to about 85 weight percent being especially suitable and which have melt indexes in the range of about 1 to about 3. Exemplary of the copolymers of ethylene and an alpha-beta monoethylenically unsaturated carboxylic acid are the commercially available copolymers wherein the carboxylic acid moiety contains from 3 to 5 carbon atoms including, for example, acrylic acid, methacrylic acid, and ethacrylic acid. Further exemplary of these copolymers are those having an ethylene moiety in excess of about 65 percent preferably in excess of about 80 percent and wherein the moiety of the alpha-beta monoethylenically unsaturated carboxylic acid is less than about 35 weight percent and preferably less than about 20 weight percent. Preferably these copolymers will have melt indexes in the range of about 1 to about 5.

As hereinbefore indicated, the non-cellullar layer which will be predominantly of ethylene moieties and will contain moieties of vinyl acetate or an alkyl ester of an alpha-beta monoethylenically unsaturated carboxylic acid, or an alpha-beta monoethylenically unsaturated carboxylic acid, or mixtures thereof, can be prepared by simply blending, or admixing, with polyethylene a copolymer of ethylene and, vinyl acetate or an alkyl ester of an alpha-beta monoethylenically unsaturated carboxylic acid or an alpha-beta monoethylenically unsaturated carboxylic acid. The polyethylene which may be employed is well known in the art and will be routinely selected by those skilled in the art. Particularly suitable polyethylene is low density polyethylene, that is polyethylene having a density of about 0.925 or less, and generally in the range of about 0.910 to about 0.925 grams per cubic centimeter. Of course, if desired, the desired non-cellular layer moiety may be provided by simply using a copolymer of the desired moiety instead of producing this equivalent moiety by blending of polyethylene with a copolymer.

In one suitable mode contemplated in practicing this invention, the polymeric cellular layer will be between about 90 to about 95 weight percent polystyrene and between about 5 to about 10 weight percent of a copolymer of about 28 weight percent vinyl acetate and about 72 weight percent of ethylene (hence producing a polymeric cellular layer with a styrene moiety of about 90 to about 95 weight percent, a vinyl acetate moiety of about 1.4 to about 2.8 percent, and an ethylene moiety of about 3.6 to about 7.2 weight percent). Preferably the cellular layer will be between about 7 or 8 percent of that copolymer and about 92 or 93 percent polystyrene. The polymeric non-cellular layer of this mode will be between about 60 weight percent to about 90 weight percent of polyethylene having incorporated therein about 10 weight percent to about 40 weight percent of a copolymer of about 28 percent vinyl acetate and about 72 weight percent of ethylene (hence producing a non-cellular layer wherein the ethylene moiety is between about 88.8 weight percent to about 97.2 weight percent and the vinyl acetate moiety being about 2.8 weight percent to about 11.2 percent). Preferably the vinyl acetate will be incorporated into the non-cellular layer by admixing about 80 weight percent of polyethylene with about 20 weight percent of that copolymer. Of course, as indicated above, if desired there is no need to employ the admixture for the non-cellular layer but these moieties may be obtained by using a copolymer per se in which the ethylene and vinyl acetate moieties are as indicated. In another suitable mode of practicing this invention, the polymeric cellular layer will consist essentially of polystyrene and the non-cellular layer will be a copolymer of about 80–85 weight percent ethylene and about 15–20 weight percent of ethyl acrylate.

The amounts of the respective materials will be routinely adjusted, given the foregoing guidelines, but, in general, it may be stated that excellent results will be generally obtained wherein the polymeric portion of the cellular layer is in excess of about 85 weight percent of styrene moieties and from about zero to about 4 or 5 weight percent of vinyl acetate, or an alkyl ester of an alpha-beta monoethylenically unsaturated carboxylic acid, or an alpha-beta monoethylenically unsaturated carboxylic acid moieties, or mixtures thereof, with the amount of ethylene varying depending on the composition of the copolymer employed. Of course the amount of the copolymer will not be an amount which is in excess of that which is miscible with the polystyrene, i.e. it will be up to a compatible amount. The composition of the polymeric portion of the non-cellular layer can of course vary as indicated, but it will preponderantly have ethylene moieties and the other moieties varied so long as a smooth, glossy, nontacky, surface is produced. Suitable moieties will include from 2 or 3, e.g. about 2.8, weight percent of vinyl acetate, or an alkyl ester of an alpha-beta monoethylenically unsaturated carboxylic acid, or alpha-beta monoethylenically unsaturated carboxylic acid, or mixtures thereof, for example up to about 40 weight percent with the ethylene moieties being between about 60 weight percent and about 97.2 percent, but preferably the ethylene moiety will be in the range of about 98 percent to about 72 or 75 weight percent with the moieties of the vinyl acetate,, alkyl ester, acid, or mixtures, as enumerated above, being between about 2 or 3 percent to about 25 or 28 weight percent.

The characteristics of the composite structure contemplated for use herein will, of course, vary with different applications. Generally, however, when the composite structure is used as a heat-shrunk sleeve about a glass container quite excellent results will be obtained by using a composite structure having a total thickness of about 8 to about 22 mils with the thickness of the non-cellular layer being about 1 to about 10 mils, preferably about 2 to about 5 mils. The density of the cellular layer will be in the range of about 4 to about 25, for example about 11 to about 18 pounds per cubic foot. Suitably the cellular layer will have a density of about 15 pounds per cubic foot and cell count at the surfaces on the order of about 10,000 to about 22,000 cells per square inch. The composite structure used herein will have a heat-shrinkage characteristic in which the shrinkage in the machine direction (or considering the sleeve, the circumferential direction) will be of major amount relative to the shrinkage in the cross, or transverse, direction (or considering the sleeve, the axial direction). Exemplary of these ratios are a heat-shrinkage in the machine direction relative to the heat-shrinkage in the cross direction of at least about 2.5:1 and, preferably, at least about 3:1, with representative heat-shrinkages, in the temperature range of about 200°F. to about 300°F., being about 35 to 85 percent in the machine direction and about 3 to about 32 percent in the cross direction.

The heat-shrinkable composite structure can be fabricated into sheets using technology which is well known to those skilled in the art. These sheets are then employed in the manner of the hereinbefore incorporated patents. The closed cellular layer which is heat-shrinkable can be produced using conventional technology for forming cellular heat-shrinkable polystyrene and, likewise, the non-cellular layer is produced using conventional technology for forming non-cellular polyethylene sheets or film. These two layers are joined together to form the composite structure, likewise employing conventional technology. In the preferred practice of forming the composite structure, extrusion coating is employed wherein the non-cellular layer of a polymeric material predominantly of ethylene moieties and the above described incorporated other moieties, e.g. ethylacrylate, is extrusion coated onto a previously formed heat-shrinkable, closed cellular film, or sheet, of a polymeric material preponderantly of polystyrene and optionally including the above described copolymers, or mixtures thereof. It is not necessary to stretch the non-cellular layer to provide it with an independent heat-shrinkable characteristic and all that is required is to extrusion coat the non-cellular polymeric material onto the heat-shrinkable, cellular polymeric material layer.

One technique for forming the heat-shrinkable cellular layer is indicated in incorporated U.S. Pat. No. 3,767,496. Other conventional techniques will be immediately apparent to those skilled in the art. The preferred technique for forming the closed cellular heat-shrinkable composite for use herein and, more specifically, the heat-shrinkable, cellular layer involves a conventional process referred to as a "blown bubble" technique in which tandem extruders are employed, one of which is a vented extruder and the other of which carries an annular, generally circular, extrusion die with a complementing mandrel, through which and over which, respectively, the blown bubble, or tube, is extruded and drawn. The tube is cut, or slit, on diametrically opposed sides and rolled onto winding wheels. The winding wheels place the extruded material under tension to produce the desired stretching, and resultant orientation, and heat-shrinkage characteristics in the cellular layer. Additionally conventional air cooling is employed to produce the desired skin layer on the respective sides of the material issuing from the die. In this technique the appropriate polymeric materials, i.e. the polystyrene and, optionally, copolymer(s), along with the requisite blowing agent, or agents, and/or nucleators, as well as suitable adjuvants, which may include pigments, stabilizers, and the like, are charged into the first extruder, the material appropriately mixed in the extruder and heated and then extruded from the second extruder and formed into the heat-shrinkable cellular layer and wound into a sheet or film of rolled stock. Generally, the polystyrene and copolymer, or mixtures, will be appropriately admixed, for example in a ribbon blender, prior to charging into the hopper for feeding into the extruder. Any of the conventional blowing agents may be employed, either with or without suitable nucleators in effective foaming or cell forming amounts. Thus, chemical blowing agents can be employed such as the conventionally well known azo compounds, N-nitroso compounds, or the sulfonyl hydrazides. Preferably, however, the blowing agent will be a physical blowing agent and most desirably will also be used in conjunction with a nucleating agent. Representative of the physical blowing agents are the alkanes, such as for example pentane, hexane, and heptane, and halogenated materials such as methyl chloride, methylene chloride, trichloroethylene, dichloroethane, dichlorotetrafluoroethane, trichlorofluoromethane, trichlorotrifluoroethane, dichlorodifluoromethane and the like. An especially suitable material is pentane, used in conjunction with a nucleating agent, e.g. a mixture of sodium bicarbonate and citric acid. The resulting sheet or film of rolled stock which is produced may then be appropriately decorated and used directly as a feed stock for forming the composite structure. If desired this roll stock may be decorated using conventional decorating techniques, with flexographic techniques, using solvent based inks, being preferred. Desirably the side of the sheet material which was the inside surface of the blown bubble and which has the smaller skin layer will be decorated.

Conventional techniques such as those disclosed in *Encyclopedia of Polymer Science and Technology*, 1965, Volume 3, pg. 777 and POLYETHYLENE, *Reinhold, Plastics Application Series*, Vol. 1, page 87, for extrusion coating a substrate with polyethylene is employed to finally fabricate the composite structure contemplated for use herein. The extrusion coating extruder is a conventional screw extruder and is charged with the selected polymeric moieties, either in the form of a copolymer or as a blend or admixture as previously described and is provided with a slit die which is disposed in close proximity to two rolls, one of which is a smooth cooled, or chilled, roll, and the other of which is a smooth rubber covered pressure roll. Of course conventional adjuvants may also be included in the charge of polymeric material supplied to the extruder. The sheet or film of the heat-shrinkable, cellular rolled stock, which may have a decorated surface portion, is supplied to the nip of these two rolls and the discharge from the slit die of the extrusion coating extruder is supplied to the nip of the two rollers whereby the two materials are brought into contact and adhering relationship with each other. If the cellular layer had previously been decorated the non-cellular layer is applied to the opposite, undecorated surface.

Of course, it is not necessary to decorate the cellular layer prior to its being extrusion coated with the non-cellular layer. That is, the non-cellular layer can be directly extrusion coated upon the previously formed cellular layer, with the non-cellular layer preferably being coated upon the surface of the cellular layer which surface was previously the outside surface of the bubble in the blown bubble technique and which surface has the larger skin layer. This composite may then be decorated using the techniques hereinbefore indicated with the decoration being applied to the exposed external surface of the cellular layer. In passing it should be mentioned that, when a non-tackifying polymer layer or coating is employed, it will be found that the exposed surface of the non-cellular layer will advantageously be coated with an organic solvent solution of the polymer and the solvent allowed to evaporate (thereby providing the desired layer or coating on the non-cellular layer of the composite) prior to submission of the composite to an appropriate decorating station. One suitable method for applying a solution of a nontackifying polymer to the exposed surface of the non-cellular portion of the composite is to simply pass that surface over gravure rolls with the solution being applied by those rolls. In the case where the cellular layer is decorated prior to having the non-cellular layer extrusion coated thereupon, all that is required would again, for example, be to pass the composite over suitable means such as, for example, gravure rolls to have the nontackifying polymer applied as a solution onto the non-cellular layer, followed by solvent evaporation to leave the residual polymer on the non-cellular layer. This material, i.e. the composite with an optional decoration on the external surface of the cellular layer and an optional coating of a nontackifying polymer on the external surface of the non-cellular layer, represents the heat-shrinkable composite structure, contemplated for use herein, is then wound onto rolls to provide the heat-shrinkable composite structure which may be employed in accordance with the teachings of U.S. Pat. Nos. 3,767,496, 3,802,942, and 3,760,968. That is, the sheet or film stock of the composite structure is appropriately slit to provide a rectilinear sheet, or film, which is then formed into a sleeve, or tubular member, by bringing the longitudinal extremities of the sheet into contact with each other and appropriately sealing these sheet extremities, preferably in an overlapped relationship, by contact with appropriate means such as, for example, by heat sealing these extremities with a heated bar or wire. The sleeve is so formed such that the major heat-shrinkage, which previously was in the machine direction of extrusion, is now in the circumferential, or radial, direction of the sleeve and the previous minor shrinkage direction, which was the cross, or transverse, direction, is now the axial direction of the sleeve. Additionally, the sleeve is so formed such that the non-cellular layer 22 is disposed inwardly of cellular layer 24. This sleeve member is then telescopically located about the sidewall 20 of container 10 with the non-cellular layer being adjacent the wall surface of the container and the cellular being disposed outwardly of the non-cellular layer. Subsequently, conventional heating techniques are employed, e.g. heating in an oven, for a time and at a temperature sufficient to allow the heat-shrinkable sleeve member to shrink, and contract, into snug engagement with the container wall surface.

While the foregoing describes the present invention with sufficient particularity to enable those skilled in the art to make and use same, there, nonetheless, follows a general example.

The composite heat-shrinkable structure contemplated for use herein is made in accordance with the following procedure. The closed cellular layer was produced employing a vented 4½ inch extruder having a length to diameter (L/D) ratio of 24:1 in tandem operation with a 6 inch screw extruder having a L/D ratio of 24:1. General purpose polystyrene, having a weight average molecular weight of about 280,000 and a melt flow of about 2.0, was first combined in a ribbon blender with a copolymer of ethylene and vinyl acetate, the copolymer being about 28 percent by weight vinyl acetate and 72 percent by weight ethylene with a melt index of about 3.0, to form a polymeric material which was about 90 weight percent polystyrene and 10 weight percent of the copolymer. The 4½ inch extruder was then fed with a charge of about 99.25 percent of the above polymeric material, about 0.34 percent by weight of sodium bicarbonate, about 0.26 percent by weight citric acid, and about 0.15 percent by weight of white mineral oil. The 4½ inch extruder was generally operated between a temperature of about 240°F. to about 425°F. and pentane (6 percent by weight of the above charge) was injected through the vent in the barrel into the 4½ inch screw extruder. The output of this extruder was then fed, at a temperature of about 425°F. into the 6 inch extruder and the latter was provided with appropriate cooling to maintain the zone temperatures in the 6 inch screw extruder in a range of about 250° to 290°F. The extrudate issued as a tubular member from the circular die of the 6 inch extruder with the die being maintained at a temperature of about 307°F. By means of tension rollers the tubular member was pulled over a sizing mandrel, which was maintained at a temperature of about 120°F., and the film then subsequently slit by diametrically opposed knives. As the extrudate issued from the die the external surface was contacted with air having a pressure on the order of about 7–8 ounces per square inch and the inside surface was contacted with air having a pressure on the order of about 14 ounces per square inch to provide a different depth skin layer on each side. The diameter of the mandrel employed was about 22.4 inches and the diameter of the tubular die being about 12.75 inches resulting in a blow up ratio of about 1.76. Additionally, the tension on the rollers was such that the resulting closed cellular layer had a machine direction heat-shrinkage of about 65 to 85 percent at 300°F. and a cross direction heat-shrinkage of about 20 to 30 percent at 300°F. The density of the resulting heat-shrinkable cellular layer is about 12 pounds per cubic foot and had a thickness of about 13 mils. The heat-shrinkable closed cellular layer with the 12 pound density and 13 mil thickness was then wound on a winding roll with the edges of the sheet being trimmed with cutting knives to provide a sheet of relatively uniform width. The throughput in the above-described process for forming the cellular heat-shrinkable layer was about 530 pounds per hour.

The non-cellular layer was produced by charging a 2½ inch screw extruder having a L/D ratio of 20:1 with a charge of a copolymer of ethylene and ethylacrylate having a density of about 0.930 gm/cm$^3$, a melt index of about 1.5 and an ethylene moiety of about 80–85 (weight) percent and an ethylacrylate moiety of about 15–20 (weight) percent. The extruder was run at a throughput of about 95 pounds per hour with the barrel temperatures ranging from about 320°F. to about 420°F. and the die having a temperature of about 430°F. A film on the order of about 2 mils was dispensed from the slit die to the nip of two juxtaposed rolls (one being a water cooled roll, and the other being a smooth rubber coated roll) and the rolled stock of the cellular layer was likewise fed into the nip wherein the films were compressed together in adhering relationship with the opposite surfaces being quite smooth. The non-cellular layer was contacted to the side of cellular layer having the thicker skin and which was previously the outside of the blown bubble. The output from this extrusion coating technique was then passed over gravure rolls so as to coat the non-cellular layer of the copolymer of ethylene and ethylacrylate with an organic solvent solution of polystyrene. The specific solution employed was a 30 weight percent solution of polystyrene (weight average molecular weight of about 20,000) in a solvent solution of about 1:1 mixture of ethyl acetate and n-propyl acetate. The coating thickness after solvent evaporation was on the order of about 0.036 mils but, in general, it may be stated that a coating thickness in the range of about 0.01 to about 0.1 mils will be satisfactory. The composite structure which has the thin coating of polystyrene on the external surface of the non-cellular layer was then supplied to a conventional flexographic decorating station where flexographic solvent based inks were employed to apply a decorative image to the external surface of the cellular layer. This decorated and coated composite heat-shrinkable laminate was then slit along the machine direction to form rectilinear strips, or sheets, of the composite and wound onto a roll for stock.

The rectilinear strips of this composite structure were then again slit (along the cross direction) and wound around a generally cylindrically shaped mandrel with the longitudinal extremities of the resulting sheet being brought into overlapping contact with each other and then heat sealed in overlapped relationship by contact with an electrically heated bar. The temperature of the heat seal bar was about 280°F. to about 300°F. The formation of this sleeve was done in such fashion that the cellular layer is disposed outwardly of the sleeve, the non-cellular layer inwardly, and the major direction of shrinkage being in the circumferential, or radial, direction. In general, the processing of the composite material, e.g. the formation of the sleeve and the formation of the package was done following the disclosures of U.S. Pat. No. 3,767,496 and 3,802,942 with the sleeve member being a full height sleeve. The sleeve member, with its smooth or nonfibrillated surfaces, was then, from beneath a glass container of the type illustrated in the drawing, telescopically located about the sidewall of the container with a portion, i.e. about the lower half inch of the sleeve being disposed beneath the lowest extremity of the container. The container had been preheated to a temperature of about 240°F. and with the telescopic location of the sleeve about the container an initial heat-shrinking took place which held it in place on the bottle. Generally, the inside diameter of the sleeve was sized to be just slightly larger, i.e. on the order of about 0.31 inch larger than the diameter of the container. The container with the sleeve on it was then put in a heating tunnel maintained at about 400° for about 5 or 6 seconds whereby final shrinking resulted in which the sleeve was brought into snug engagement with the wall surface and the lower portion of the sleeve shrunk so as to extend inwardly into the recessed bottom of the container. It was observed that prior difficulties with splitting and tearing were significantly alleviated and the resulting container was quite aesthetically pleasing and exhibited fine glass retention characteristics. This sleeve, likewise, possessed all the desired balance of properties required for such application.

The procedure as described immediately above was generally repeated with the thickness of the film of the copolymer of ethylene and ethylacrylate being about 3, about 4, and about 5 mils respectively on succeeding runs. The final packages produced, using the materials showed excellent characteristics with the glass retention characteristics of the packages generally improving with film thickness. Additionally, the same type of composite structures were employed but with the cellular layer being disposed intermediate the non-cellular layer and the glass surface; testing of the latter type materials showed that the glass retention characteristics of the structure of this invention were superior to the characteristics attained using structure set forth in my co-pending application U.S. Ser. No. 505,646. In general, it was also indicated that by employing the structure of the present invention, glass retention characteristics could be obtained which, if following the structure of the aforementioned co-pending application, would require greater thicknesses of the non-cellular layer. The economy of this will be readily apparent to those skilled in the art. Additionally, in the destructive testing of these two types of structures it was observed that the splitting of the seam which was formed by the heat sealing operation was less in the case of the present structure, i.e., the structure where the non-cellular layer was disposed intermediate the wall of the container and the cellular layer.

While the foregoing describes the present invention with sufficient particularity to enable those skilled in the art to make and use same, it will be apparent that modification is possible which does not depart from the spirit thereof. In the claims which follow it will be apparent that reference to the composition of the respective layers is to the polymeric material thereof and does not exclude the presence of conventional adjuvants in either, or both, of layers such as, for example, pigments, stabilizers, plasticizers, and the like; usually however there will be no need for such adjuvants.

I claim:

1. In an article of manufacture comprising a container having an annular rim defining a mouth opening at one end thereof, a lower end providing a bottom thereof, and an annular wall interposed said rim and said lower end, and further including a heat-shrunk, polymeric sleeve disposed circumferentially outwardly of said wall and in snug engagement therewith, the improvement wherein said polymeric sleeve is a composite structure of a closed cellular polymeric layer preponderantly of polystyrene having incorporated therein, in an amount from zero weight percent up to compatible amounts, a copolymer of ethylene and vinyl acetate, or a copolymer of ethylene and an alkyl ester of an alpha-beta monoethylenically unsaturated carboxylic acid, or a copolymer of ethylene and an alpha-beta monoethylenically unsaturated carboxylic acid, or mixtures thereof, and a non-cellular polymeric layer having preponderantly ethylene moieties and incorporated therein moieties of vinyl acetate or an alkyl ester of an alpha-beta monoethylenically unsaturated carboxylic acid, or an alpha-beta monoethylenically unsaturated carboxylic acid, or mixtures thereof, the amount of said incorporated moieties in said non-cellular layer being sufficient to promote the adhesion of said layers, said cellular layer being disposed outwardly of said non-cellular layer and said non-cellular layer being disposed intermediate said cellular layer and said wall.

2. The improvement of claim 1 wherein said cellular polymeric layer consists essentially of polystyrene and a copolymer of ethylene and vinyl acetate and said non-cellular polymeric layer consists essentially of ethylene moieties and vinyl acetate moieties.

3. The improvement of claim 2 wherein said copolymer is a copolymer of about 28 weight percent vinyl acetate and about 72 weight percent ethylene, said copolymer being present in said cellular layer in an amount of about 5 to about 10 weight percent and said polystyrene being present in an amount of about 90 to about 95 weight percent.

4. The improvement of claim 3 wherein said non-cellular polymeric layer consists essentially of about 60 to about 90 weight percent polyethylene admixed with about 10 to about 40 weight percent of a copolymer of about 28 weight percent vinyl acetate and about 72 weight percent ethylene.

5. The improvement of claim 1 wherein saiad cellular polymeric layer consists essentially of polystyrene and said non-cellular layer consists essentially of a copolymer of ethylene and ethyl acrylate.

6. The improvement of claim 5 wherein said copolymer is a copolymer of about 11 to about 22 weight percent ethyl acrylate and about 89 to about 78 weight percent ethylene.

7. The improvement of claim 1 wherein said cellular layer consists essentially of polystyrene and a copolymer of ethylene and an alpha-beta monoethylenically unsaturated carboxylic acid.

8. The improvement of claim 1 wherein said non-cellular layer consists essentially of a copolymer of ethylene and ethyl acrylate and said cellular layer consists essentially of polystyrene and a copolymer of ethylene and vinyl acetate.

9. The improvement of claim 1 wherein said non-cellular layer has a layer, disposed intermediate said non-cellular layer and said wall, of a nontackifying polymeric material.

10. A heat-shrinkable sleeve shaped article of composite construction, said article having an outwardly disposed layer of a heat-shrinkable closed cellular polymeric material consisting essentially of preponderantly polystyrene and, from zero weight percent up to compatible amounts, of a member selected from the group consisting of a copolymer of ethylene and vinyl acetate, a copolymer of ethylene and an alkyl ester of an alpha-beta monoethylenically unsaturated carboxylic acid, and a copolymer of ethylene and an alpha-beta monoethylenically unsaturated carboxylic acid, and mixtures thereof, and including an inwardly disposed layer of a non-cellular polymeric material in adhered engagement to said closed cellular polymeric material, said non-cellular polymeric material consisting essentially of preponderantly ethylene moieties and moieties of a member selected from the group consisting of vinyl acetate, an alkyl ester of an alpha-beta monoethylenically unsaturated carboxylic acid, an alpha-beta monoethylenically unsaturated carboxylic acid, and mixtures thereof, the amount of said moieties being sufficient to promote the adhesion of said respective layers, said sleeve having a circumferential heat-shrinkage, in the temperature range of about 200°F. to about 300°F., or about 35 to about 85 percent and a heat-srhinkage in the axial direction, in said temperature range, of about 3 to about 32 percent and wherein the ratio of said circumferential heat-shrinkage to said axial heat-shrinkage is at least about 2.5:1.

11. The improvement of claim 10 wherein said cellullar polymeric layer consists essentially of polystyrene and a copolymer of ethylene and vinyl acetate and said non-cellular polymeric layer consists essentially of ethylene moieties and vinyl acetate moieties.

12. The improvement of claim 11 wherein said copolymer is a copolymer of about 28 weight percent vinyl acetate and about 72 weight percent ethylene, said copolymer being present in said cellular layer in an amount of about 5 to about 10 weight percent and said polystyrene being present in an amount of about 90 to about 95 weight percent.

13. The improvement of claim 10 wherein said cellular polymeric layer consists essentially of polystyrene and said non-cellular layer consists essentially of a copolymer of ethylene and ethyl acrylate.

14. The sleeve shaped member of claim 10 wherein said non-cellular layer consists essentially of a copolymer of ethylene and ethyl acrylate and said cellular layer consists essentially of polystyrene and a copolymer of ethylene and vinyl acetate.

15. The sleeve shaped member of claim 14 wherein said inwardly disposed non-cellular layer has a lyer of polystyrene on its inwardly exposed surface.

16. The sleeve shaped member of claim 14 wherein said inwardly disposed non-cellular layer has a layer of poly(alpha-methyl styrene) on its inwardly exposed surface.

* * * * *

UNITED STATES PATENT AND TRADEMARK OFFICE
CERTIFICATE OF CORRECTION

PATENT NO. : 3,979,000
DATED : September 7, 1976
INVENTOR(S) : James A. Karabedian It is certified that error appears in the above-identified patent and that said Letters Patent are hereby corrected as shown below:

Column 1, at about line 7, "Dec" should be --Sept.--.

Column 5, lines 60-61, delete "monoethylenically" and insert --has--.

Column 6, line 55, delete "agents" and insert --amounts--.

Column 17, line 12, claim 5, "saiad" should be --said--.

Column 18, line 40, claim 15, "lyer" should be --layer--.

Signed and Sealed this

First Day of November 1977

[SEAL]

Attest:

RUTH C. MASON
*Attesting Officer*

LUTRELLE F. PARKER
*Acting Commissioner of Patents and Trademarks*